United States Patent [19]

Grosse

[11] Patent Number: 4,702,132
[45] Date of Patent: Oct. 27, 1987

[54] CENTERING FIXTURE FOR WOOD TURNING LATHE

[76] Inventor: Hillman R. Grosse, 1226 Emilie St., Green Bay, Wis. 54301

[21] Appl. No.: 845,824

[22] Filed: Mar. 25, 1986

[51] Int. Cl.[4] ............................................. B23B 33/00
[52] U.S. Cl. ..................................... 82/40 R; 142/53
[58] Field of Search ....................... 142/48, 53, 56, 57; 82/33 R, 40 R, 45; 279/1 L, 28; 269/270, 902; 144/209 A, 209 R

[56] References Cited

U.S. PATENT DOCUMENTS

| | | | |
|---|---|---|---|
| 60,169 | 12/1866 | Gardiner | 82/45 |
| 935,143 | 9/1908 | Davis | 82/40 R |
| 2,341,926 | 2/1944 | Lauby | 82/40 |
| 2,370,918 | 3/1945 | Rohl | 142/53 |
| 3,273,611 | 9/1966 | Hagquist et al. | 142/53 |
| 4,271,881 | 6/1981 | Hitt | 142/53 |
| 4,342,348 | 8/1982 | Lichtenwalter | 142/53 |
| 4,398,579 | 8/1983 | Holdahl et al. | 142/53 |

FOREIGN PATENT DOCUMENTS

| | | | |
|---|---|---|---|
| 597197 | 1/1948 | United Kingdom | 82/33 R |
| 2059308 | 4/1981 | United Kingdom | 82/33 R |

*Primary Examiner*—M. Jordan
*Assistant Examiner*—Jerry Kearns

[57] ABSTRACT

An improved centering system for turning lathes consisting of a conical device milled with four grooves, equally spaced, to accept corners of square stock to be turned which will provide for concentric turnings. The centering fixture is improved in that it receives the corners rather than the sides of widely varying stock to assure that the center will be obtained.

1 Claim, 4 Drawing Figures

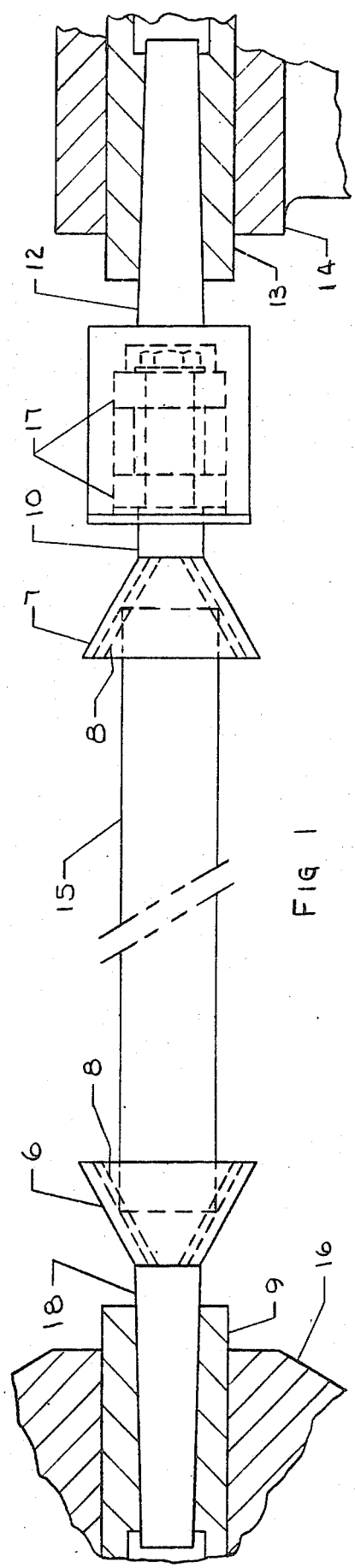
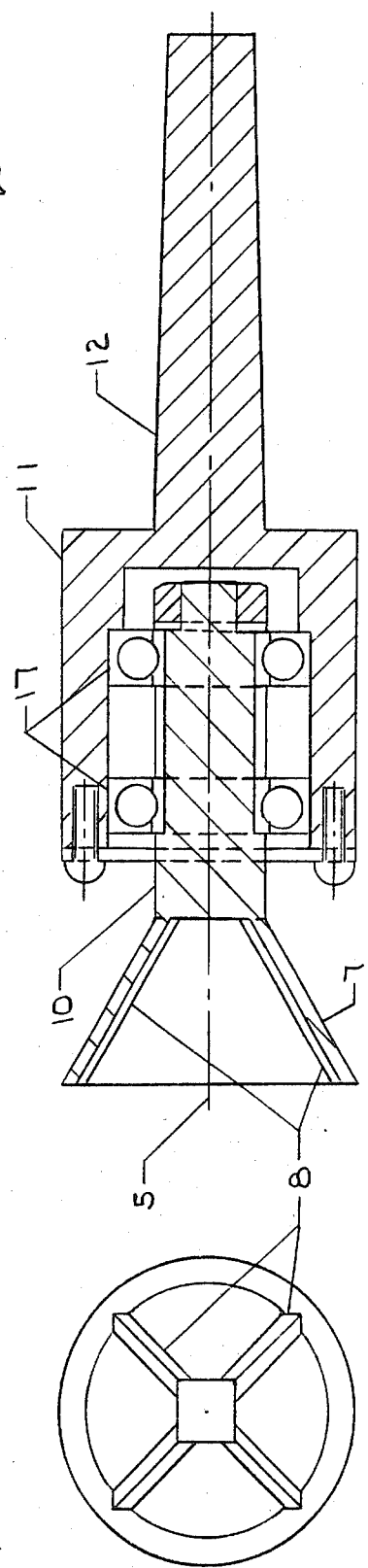

CENTERING FIXTURE FOR WOOD TURNING LATHE

BACKGROUND OF THE INVENTION

This invention relates generally to the use of a conical device to accurately obtain the center of square stock turned in a lathe. More specifically, it relates to a fixture that has v-shaped grooves inside the fixture, with these grooves also acting as the means to center the stock that is to be turned.

Wood turning lathes are used for the manufacture of chair and table legs, stairway ballisters, and other spindles. In the making of these spindles, it is desirable to have decorative designs on the spindle. It is imperative, therefore, to obtain the center of the stock and to hold the stock at that center throughout the turning of stock. It is further desirable to have a centering device that does not cut into the stock which may cause the stock to split. Finally, it is advantageous to have a centering device that is versatile in its use that it may accept any type or size of stock. The present invention with its cone, or more specifically, centering heads will accept a wide variety of sizes without the need to have many, expensive heads to hold stock of varying sizes.

Prior centering fixtures did not have the versatility to accept all sizes of stock without multiple, expensive pieces. Also, these prior fixtures harmed or may have split the stock, possibly making the stock not usable for its intended purpose. Further, previous centering devices did not center using the corners of the stock, thus they did not ensure an accurate center. Some specific examples of the prior art problems that are solved by the present invention are that when a square piece of stock is placed in a cone with protruding blades, such as shown by the Gardiner patent (U.S. Pat. No. 60,169, dated Dec. 4, 1866), there is no assurance that the stock at once be siezed in the center of the conical body as is argued in cited patent, or that the center of the stock has been achieved at both ends of the stock in the lathe. When the stock is pushed on the blades, they hold the stock and may split or otherwise harm the stock. Another example of prior art problems solved by this invention is that the prior centering fixtures were limited in sizes of stock that could be used. The prior art, as shown in the Hagquist patent (U.S. Pat. No. 3,272,611, dated Sep. 20, 1966), centered using specific varying levels that only stock specifically of the same size of those levels would obtain accurate centers. A final problem solved by the present invention lies in the prior art using the sides of the stock to center, as patented by Davis (U.S. Pat. No. 935,143, dated Sep. 28, 1909). These prior devices had adjustable holders tightened by set screws that were to tighten down on the sides of the stock. Because these were adjustable, there was no guarantee an accurate center had been achieved, as each side could not conceivably be adjusted in the exact same increments.

The present centering fixture solves these problems by using two fixtures, one on the head stock and one on the tail stock of the lathe. Because these two fixtures are identical, they both hold the stock at the same center. Also, the centering fixtures are conical with interior grooves to accept near universal sizes of stock. Further, because of these grooves, the present invention passively accepts and holds the stock in these grooves rather than actively cutting into the stock.

SUMMARY OF THE INVENTION

In brief, the centering fixture is a cone shaped receptacle with four grooves, equally spaced, milled inside the cones to hold wood stock, which is reasonably square, while the stock is turned on a wood turning lathe. The grooves are v-shaped to accept the corners of the stock and the cone tapers to a stem to be held in the spindles of the lathe. The taper of the cone is gradual; to accept widely varying sizes of stock.

BRIEF DESCRIPTION OF THE DRAWINGS

FIG. 1 is a view showing the stock placed in the centering heads which are placed in the spindles of the lathe.

FIG. 2 is a sectional view of the head stock centering fixture shown in FIG. 1.

FIG. 3 is an end view of either the head or tail stock centering fixture looking down into the cone, showing the milled v-shaped grooves.

FIG. 4 shows a fragmentary view of the tail stock centering head.

DETAILED DESCRIPTION OF THE PREFERRED EMBODIMENT

The intended use of the present invention is to place square stock 15 that is to be turned into centering fixture 6 on one end and centering fixture 7 on the other end as shown by FIG. 1. Centering fixture 6 is to be placed by tapered shaft 18 into lathe spindle 9 in lathe stock 16 so that fixture 6 is driven by the lathe; which, of course, drives the stock 15 to be machined. Therefore, matching centering fixture 7 is identical to fixture 6 in every respect save that fixture 7 is fitted with a frictionless thrust bearing 17 or other suitable means to allow centering fixture 7 to turn freely with stock 15 that is driven by fixture 6.

Centering fixture 7 has shaft 10 to fit inside thrust bearing 17 which is inside housing 11 fitted with a tapered shaft 12 to fit tail stock quill 13 as shown in FIGS. 1 and 4. This assembly is placed in tail stock 14. Tail stock 14 is then clamped to the lathe (not shown in drawings) and tail stock quill 13 is moved horizontally toward centering fixture 6 to tighten stock 15 to be turned.

The centering fixtures 6 and 7 are cone shaped internally, tapering to a square end at approximately a thirty (30) degree taper, milled with four v-shaped grooves 8 that are equally spaced to accept the corners of must be machined identically so as to provide centers that are identical on both ends of stock 15. Further, fixtures 6 and 7 must be machined to run true along longitudial axis 5. After stock 15 is turned and finished, ease of removal is evident as tail stock quill 13 is loosened to remove stock 15. Stock 15 is not held by knives or points, thus the square ends are ready to be finished or to be cut off.

Because of the centering fixtures, all ornamental turnings on stock 15 are concentric with square ends.

It can be appreciated that though the description of the preferred embodiment has been given, modifications and adaptations will become apparent to those skilled in the art and those modifications and adaptations are intended to come with the scope of the following claim.

Therefore, I claim:

1. A conical device used for centering wood on a wood turning lathe, composed with;
   a. four grooves, equally spaced, milled on the interior of the cone to accept the corners of a reasonably square piece of wood,
   b. an interior to be tapered with a thirty degree taper.

* * * * *